US006965790B1

(12) United States Patent
Mendolia

(10) Patent No.: US 6,965,790 B1
(45) Date of Patent: Nov. 15, 2005

(54) ACOUSTIC PIPE FOR FLIP STYLE CELLULAR TELEPHONE

(75) Inventor: Gregory S. Mendolia, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 1397 days.

(21) Appl. No.: 08/880,648

(22) Filed: Jun. 23, 1997

(51) Int. Cl.7 .............................................. H04M 1/00
(52) U.S. Cl. ................... 455/575.3; 455/128; 455/347; 379/433.13
(58) Field of Search .............. 379/433, 428.01–428.04, 379/429–431, 433.01–433.13, 440; 455/575, 455/568, FOR 100, FOR 121, 550, 90, 575.1–575.8, 455/90.1–90.3, 128, 347, 348, 349

(56) References Cited

U.S. PATENT DOCUMENTS

| 4,471,493 A | | 9/1984 | Schober | |
|---|---|---|---|---|
| 5,197,091 A | * | 3/1993 | Takagi et al. | 455/90 |
| 5,832,079 A | * | 11/1998 | Rabe | 379/433 |
| 5,890,072 A | * | 3/1999 | Rabe | 455/550 |
| 5,915,015 A | * | 6/1999 | Thornton | 379/433 |
| 5,963,640 A | * | 10/1999 | Rabe | 379/433 |
| 6,091,964 A | * | 7/2000 | Frohlund | 455/550 |
| 6,091,972 A | * | 7/2000 | Ogasawara | 455/575 |
| 6,101,402 A | * | 8/2000 | Bartha et al. | 455/569 |

FOREIGN PATENT DOCUMENTS

| EP | 0 120 418 | 10/1984 |
|---|---|---|
| EP | 0 275 996 | 7/1988 |
| WO | 97 42746 | 11/1997 |

OTHER PUBLICATIONS

Abstracts of Japan, vol. 013, No. 046, (E-711) Feb. 2, 1989, of JP 63 24244A.

* cited by examiner

Primary Examiner—Charles Craver
(74) Attorney, Agent, or Firm—Myers Bigel Sibley & Sajovec, P.A.

(57) ABSTRACT

A flip style cellular telephone includes a main housing, a microphone mounted in the main housing and a flip, pivotably mounted to the main housing by a hinge. The flip is formed with an acoustic pipe on a peripheral edge of the flip. The acoustic pipe extends from the free end to the hinged end of the flip, and includes a plurality of holes for a sound inlet at the free end of the flip. The hinge is hollow, and the acoustic pipe connects with the microphone through the hollow hinge. Sound of the user's voice is carried by the acoustic pipe from the inlet to the microphone. The acoustic pipe advantageously only minimally changes the profile and aesthetics of the telephone.

13 Claims, 1 Drawing Sheet

ACOUSTIC PIPE FOR FLIP STYLE CELLULAR TELEPHONE

The invention relates to cellular telephones, and in particular to cellular telephones having a flip cover.

BACKGROUND AND SUMMARY

Cellular telephones have been designed to be smaller to reduce the size and weight to be easier to hold and carry. One result of the smaller size, however, is that the microphone is farther from the user's mouth, which makes it more difficult for the microphone to pick up the user's voice.

The flip, the pivotable portion that covers the keypad and flips open when the telephone is in use, has been used to help overcome this problem, but with mixed results. One approach has been to place the microphone at the free end of the flip. This approach, however, requires that wires be run to the microphone, which adds cost and manufacturing steps. In addition, the wires must be routed across the hinge, or an electrical connection must be incorporated in the hinge. This also adds cost, and creates other problems with the connections or wires wearing or breaking after repeated use. In addition, connections at the hinge can create substantial acoustic interference and/or distortion.

Another approach has been to build an acoustic wave guide into the flip. The wave guide is a triangular shaped cavity formed between panels in the flip that funnels sound to the hinge. An opening in the hinge directs the sound to the microphone. This approach requires that the flip be made thicker to accommodate the wave guide, which increases the thickness of the telephone itself, and diminishes its aesthetic appeal.

The present invention provides a solution to the problem of guiding voice sound to the microphone in a flip style cellular telephone that eliminates the disadvantages in the art.

According to the present invention, a flip style cellular telephone includes a main housing and a flip mounted to the main housing by a hinge. The flip has an acoustic pipe, a hollow sound-carrying channel, that extends on a peripheral edge of the flip from the free end to the hinged end to carry sound from the free end, which is positioned near the user's mouth, to the hinged end, near where the microphone is located.

The location of the acoustic pipe on the peripheral edges of the flip advantageously positions the additional thickness on the periphery of the flip, so that the portion of the flip that covers the key pad remains thin, and the profile of the unit as a whole is aesthetically pleasing. The main housing of the telephone can be shaped to accommodate the acoustic pipe when the flip is in the closed position to maintain the thin profile of the telephone.

A microphone is mounted in the main housing. The microphone is in acoustic communication with the acoustic pipe to receive sound from the acoustic pipe. Preferably, the hinge is hollow and the acoustic pipe connects to the microphone through the hollow hinge.

The acoustic pipe may extend along one side of the flip, or preferably, the acoustic pipe extends along the entire surrounding peripheral edge of the flip. A portion of the acoustic pipe may be formed as a closed cavity to tune a remaining portion that connects with the microphone.

According to another aspect of the invention, the acoustic pipe has openings at the free end of the flip for sound entry. The openings are preferably formed as slots in a central portion of the free end.

BRIEF DESCRIPTION OF THE DRAWINGS

The invention will become better understood by reference to the description that follows, in conjunction with the appended drawings, in which.

DETAILED DESCRIPTION

Figure 1:
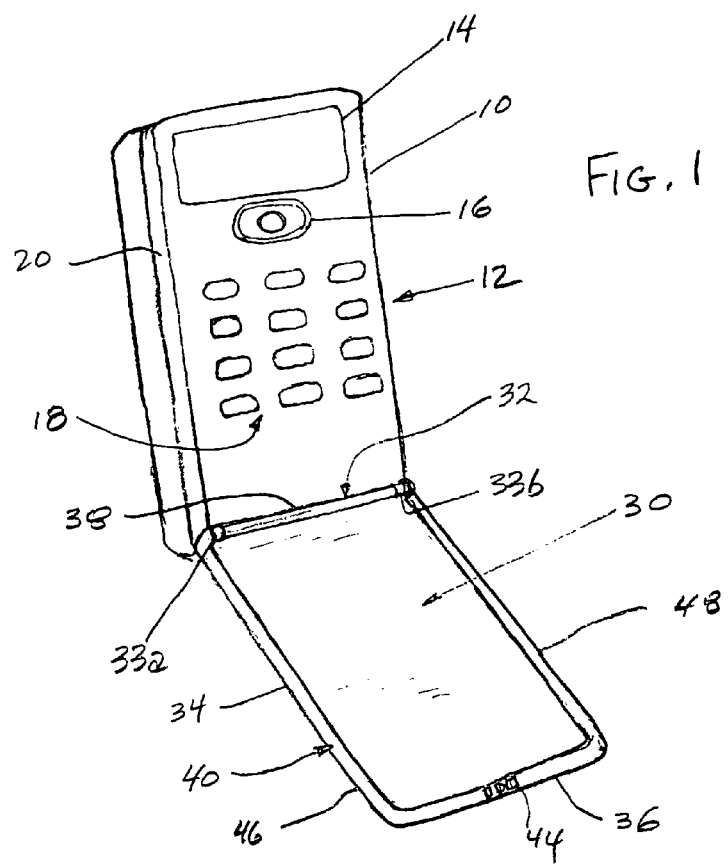
FIG. 1 is a perspective view of a flip style cellular telephone in accordance with the invention.

A flip style cellular telephone in accordance with the invention includes a main housing 10 and a flip 30. The housing 10 includes a front panel 12 having the display screen 14, ear piece 16 and key pad 18. The housing 10 also contains the electronic circuitry (not illustrated) of the telephone.

The flip 30 is connected for pivoting movement to the main housing 10 by a hinge 32. The flip 30 is pivotable from an open position, as shown in FIG. 1 in which the flip is away from the front of the housing 10 and a closed position in which the flip overlays the front panel 12 and keypad 18 of the housing (illustrated in the end view of FIG. 2). Alternatively, the flip may be made to cover only the keypad when in the closed position.

The flip 30 includes an acoustic pipe 40 formed on a peripheral edge 34 of the flip. The acoustic pipe 40 is a hollow conduit that leads from the free end 36 of the flip to the hinged end 38 and main housing 10 of the telephone. A sound opening 44, including a plurality of small holes, is provided in the acoustic pipe 40 at the free end 36. When the flip 30 is in the open position as in FIG. 1, and the telephone is positioned for use with the earpiece 16 at the user's ear, the free end 36 of the flip 30 and the sound opening holes 44 will be near the user's mouth. Sound made by the user may then enter the acoustic pipe 40 to carry from the opening 44 to the hinged end 38.

Figure 3:
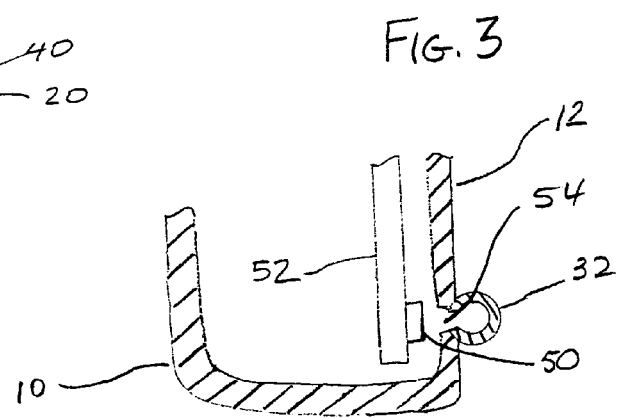
FIG. 3 is a side section view of the telephone according to the invention showing an acoustic connection of a hinge with a microphone.

As shown in FIG. 3, the telephone includes a microphone 50 mounted on a circuit board 52 in the housing 10. Sound carried by the acoustic pipe 40 enters the housing 10 and is picked up by the microphone 50.

In the illustrated embodiment, the hinge 32 is tubular and includes two bosses 33a and 33b, formed on the opposite ends of the hinge. Each boss 33a, 33b has a recessed portion to accept a hinge pin formed on the flip. Preferably, the hinge 32 and the bosses 33a, 33b, are hollow, as illustrated in FIG. 3, and the hinge pin is also hollow, which allows sound to transmit from the acoustic pipe 40 through the hinge and to the microphone 50. A hole 54 in the hinge allows sound to move from the hinge to the microphone.

According to a preferred embodiment, the microphone 50 is positioned adjacent to one hinge end, for example, the hinge end 33a, and sound is transmitted by a first acoustic path 46 from the sound opening 44 along the acoustic pipe 40 and through the hinge end 33a, and simultaneously through a longer acoustic path, which includes the acoustic pipe portion 48 and the hollow hinge tube 38. The different length acoustic paths help to tune the sound that reaches the microphone, which has been found to improve the sound quality.

Having two acoustic paths also provides a redundancy of function to ensure that sound will reach the microphone, and the telephone will function, in the unlikely event that one of the acoustic paths becomes clogged or blocked.

Alternatively, the first acoustic path 46 or the second path 48 alone may be used to transmit sound to the microphone. The hinge end on the unused path may be blocked to prevent sound transmission. The microphone 50 may be placed at a suitable location along the hinge tube 38 so that the length of the acoustic path may be selected. Depending on where the microphone is located, the acoustic pipe 40 may connect to the housing 10 through a hole in the hinge 38 or one of the hinge ends, as is convenient.

The acoustic pipe 40 is illustrated as having a circular cross-section, which is the preferred embodiment. Other cross-sectional shapes are also possible as equivalents.

Figure 2:
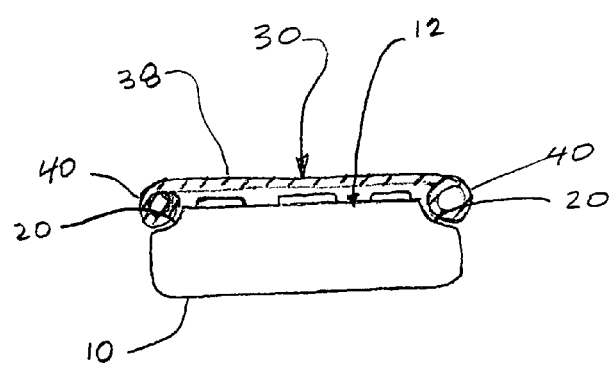
FIG. 2 is an end section view of the telephone of FIG. 1 showing the flip in a closed position.

As shown in FIG. 2, the acoustic pipe 40 is formed on the flip 30 so that an outer side 38 of the flip is substantially planar. The acoustic pipe 40 extends toward the opposite side of the flip 30. To maintain a small profile for the telephone, the main housing 10 is formed with a recess 20, which, in the illustrated embodiment, is a cove to match the circular acoustic pipe 40, to receive the acoustic pipe when the flip is in the closed position overlaying the front panel 12 of the housing.

The invention has been described in terms of preferred principles and illustrative embodiments, however, the invention is not limited to the embodiments shown and described. Those skilled in the art will understand that substitutions and equivalents may be used without departing from the scope of the invention as defined in the following claims.

What is claimed is:

1. A flip style cellular telephone, comprising:
   a main housing;
   a flip, pivotally mounted to the main housing by a hinge, the flip having a free end remote from the hinge; and
   an acoustic pipe extending extending on a peripheral edge of the flip from the free end to the hinged end to carry sound from the free end to the hinged end of the flip.

2. The flip style cellular telephone as claimed in claim 1, further comprising a microphone mounted in the main housing and in acoustic communication with the acoustic pipe.

3. The flip style cellular telephone as claimed in claim 2, wherein the hinge is hollow and the acoustic pipe connects to the microphone through the hinge.

4. The flip style cellular telephone as claimed in claim 1, wherein the acoustic pipe provides a single acoustic pathway from the free end to the hinged end of the flip.

5. The flip style cellular telephone as claimed in claim 1, wherein the acoustic pipe extends along the entire surrounding peripheral edge of the flip.

6. The flip style cellular telephone as claimed in claim 5, further comprising a microphone mounted in the main housing to receive sound from the acoustic pipe.

7. The flip style cellular telephone as claimed in claim 6, wherein the microphone is located nearer one end of the hinge, so that two acoustic paths of differing length to transmit sound to the microphone are provided.

8. The flip style cellular telephone as claimed in claim 1, wherein the acoustic pipe has a sound entry opening at the free end of the flip.

9. The flip style cellular telephone as claimed in claim 1, wherein the acoustic pipe is a hollow channel formed in the peripheral edge of the flip.

10. A flip style cellular telephone, comprising:
    a main housing;
    a microphone mounted in the main housing;
    a flip, pivotally mounted to the main housing by a hinge, the flip having a free end remote from the hinge; and
    an acoustic pip extending extending on a peripheral edge of the flip from the free end to the hinged end, the acoustic pipe having a sound inlet at the free end of the flip and being in acoustic communication with the microphone, wherein sound is transmittable by the acoustic pipe from the inlet to the microphone.

11. The flip style cellular telephone as claimed in claim 10, wherein the hinge is hollow and the acoustic pipe connects to the microphone through the hinge.

12. The flip style cellular telephone as claimed in claim 10, wherein the acoustic pipe extends along the entire surrounding peripheral edge of the flip.

13. The flip style cellular telephone as claimed in claim 12, wherein the microphone is located nearer one end of the hinge, so that two acoustic paths of differing length to transmit sound to the microphone are provided.

* * * * *

UNITED STATES PATENT AND TRADEMARK OFFICE
CERTIFICATE OF CORRECTION

PATENT NO. : 6,965,790 B1
DATED : November 15, 2005
INVENTOR(S) : Mendolia

It is certified that error appears in the above-identified patent and that said Letters Patent is hereby corrected as shown below:

<u>Column 3,</u>
Line 35, should read -- an acoustic pipe entirely extending on a peripheral edge --.

Signed and Sealed this

Twenty-third Day of May, 2006

JON W. DUDAS
*Director of the United States Patent and Trademark Office*